(12) United States Patent
Milanes et al.

(10) Patent No.: US 11,225,157 B1
(45) Date of Patent: Jan. 18, 2022

(54) EV HOME CHARGING UNIT AND METHOD OF USE

(71) Applicants: Robert Michael Milanes, Foothill Ranch, CA (US); Edward Milanes, Simi Valley, CA (US)

(72) Inventors: Robert Michael Milanes, Foothill Ranch, CA (US); Edward Milanes, Simi Valley, CA (US)

( * ) Notice: Subject to any disclaimer, the term of this patent is extended or adjusted under 35 U.S.C. 154(b) by 33 days.

(21) Appl. No.: 16/236,960

(22) Filed: Dec. 31, 2018

Related U.S. Application Data

(60) Provisional application No. 62/708,996, filed on Dec. 29, 2017.

(51) Int. Cl.
*H02J 7/00* (2006.01)
*B60L 53/30* (2019.01)
*B60L 53/16* (2019.01)

(52) U.S. Cl.
CPC ............... *B60L 53/30* (2019.02); *B60L 53/16* (2019.02); *H02J 7/00* (2013.01); *H02J 7/0042* (2013.01)

(58) Field of Classification Search
CPC ... Y02T 90/14; Y02T 10/7005; Y02T 90/128; Y02T 10/7088; Y02T 90/163
See application file for complete search history.

(56) References Cited

U.S. PATENT DOCUMENTS

| | | | |
|---|---|---|---|
| 2,719,203 A | 9/1955 | Gelzheiser et al. |
| 3,162,739 A | 12/1964 | Klein et al. |
| 3,197,582 A | 7/1965 | Norden |
| 3,307,002 A | 2/1967 | Cooper |
| 4,129,762 A | 12/1978 | Burchet |
| 4,166,988 A | 9/1979 | Ciarcia et al. |
| 4,220,934 A | 9/1980 | Wafer et al. |
| 4,255,732 A | 3/1981 | Wafer et al. |
| 4,263,492 A | 4/1981 | Maier et al. |
| 4,276,527 A | 6/1981 | Gerbert-Gaillard et al. |
| 4,297,663 A | 10/1981 | Seymour et al. |
| 4,368,444 A | 1/1983 | Preuss et al. |
| 4,375,022 A | 2/1983 | Daussin et al. |
| 4,376,270 A | 3/1983 | Staffen |
| 4,383,146 A | 5/1983 | Bur |
| 4,401,872 A | 8/1983 | Boichot-Castagne et al. |
| 4,492,941 A | 1/1985 | Nagel |
| 4,550,360 A | 10/1985 | Dougherty |
| 5,289,148 A | 2/1994 | Siglock et al. |
| 5,424,894 A | 6/1995 | Briscall et al. |
| 5,519,561 A | 5/1996 | Mrenna et al. |
| 5,534,835 A | 7/1996 | McColloch et al. |
| 5,543,595 A | 8/1996 | Mader et al. |
| 5,581,219 A | 12/1996 | Nozawa et al. |
| 6,252,365 B1 | 6/2001 | Morris et al. |
| 6,340,926 B1 | 1/2002 | Chu |
| 6,937,461 B1 | 8/2005 | Donahue, IV |
| 7,977,818 B1 | 7/2011 | Wahl |
| 8,292,657 B2 | 10/2012 | Singh |
| 8,362,646 B2 | 1/2013 | Wahl |
| 9,762,078 B2 | 9/2017 | Gale et al. |
| 2002/0060891 A1 | 5/2002 | Buie, Jr. |

*Primary Examiner* — Arun C Williams
(74) *Attorney, Agent, or Firm* — Sandy Lipkin

(57) ABSTRACT

An enclosure that contains a NEMA 14-50 plug (or equivalent) and a 50 Ampere circuit breaker that will be wired directly to the main electrical panel of a home without any modifications to the electrical panel, designed primarily for speedy home electric charging. The invention does not require the use of an electrician or building permits and is portable between locations.

2 Claims, 10 Drawing Sheets

EV HOME CHARGING UNIT AND METHOD OF USE

REFERENCE TO PRIOR APPLICATION

This application claims priority of the provisional patent application 62/708,996, filed Dec. 29, 2017 entitled EZ 240V by Robert Michael Milanes and Edward Milanes.

BACKGROUND OF THE INVENTION

Field of the Invention

The present invention relates generally to the field of electronic charging outlets and more particularly toward a device that can be installed into a home garage to convert 120 v to 240 v without changing the electrical wiring in the house that allows for charging an electrical car in a shorter amount of time and wherein the device is portable and not a permanent fixture to any given dwelling.

Description of the Prior Art

Electric vehicles are becoming increasingly popular and consumers who own them need to have the ability to charge the cars at home to make the switch from gas-powered to electric-powered affordable and convenient. Most owners charge their electric vehicles at home. Most garages, however, are equipped with standard 120 v outlets that will provide only what is known as level one charging, which translates into 4 miles of charge per hour. Because of this, up to twenty hours can be required, depending on the vehicle, to reach a full charge at level one charging.

Level two charging, on the other hand, can charge an electric vehicle at a rate of 20-25 miles per hour, but level two charging requires a 220 v outlet. For the average electric vehicle, level one charging typically takes between 8-14 hours for a full recharge. On the other hand, level two charging, like what is found at commercial charging stations, typically takes only 4-8 hours to fully charge a typical electric vehicle.

Commercial charging stations charge a fee and are located in public areas and can be convenient for traveling but for regular use, commercial charging stations are not a viable solution for electric car charging on a regular basis due to the extra cost and inconvenience of being away from one's home for several hours. For this reason, it is advantageous to have level two charging at home. However, to be able to have level two charging at home, the consumer currently needs to have an electrician make modifications to the installation wall of the home as well as the home electrical panel that includes installing a 50 amp breaker, which requires a permit in addition to the expense of having an electrician do the work, which can cost the consumer typically $1000 to $1500. Currently, this is the only way to get 240 v level two charging at a residence if it is not already equipped with such.

It is the object of the instant invention to provide level two charging in a home with a simple device that does not require an electrician, home modifications or municipal permits to install.

It is yet a further object of the instant invention to provide a device that provides level two charging in a residence that is portable between residences.

It is yet another object of the invention to provide an easy way for a homeowner or house resident to provide a 240 v plug for any appliances that requires same.

SUMMARY OF THE INVENTION

The preferred embodiment of the present invention teaches a portable charging station for electric cars and appliances comprising: an enclosure having two sidewalls, a front panel, an open bottom and a top; a receptacle for receiving a charging device mounted to said top; a 50 amp circuit breaker inside of said enclosure; a first wire for direct connection from said receptacle to the main electrical panel of a dwelling, said first wire having a specific color that passes through said open bottom of said enclosure with a terminal lug to a hot busbar screw that carries 120V AC and is secured thereto with a nut to a terminal bar; a second wire for direct connection from said receptacle to said main electrical panel, said second wire having a specific color that differs from said first wire that passes through said open bottom of said enclosure with a terminal lug to a hot busbar screw that carries 120V AC and is secured thereto with a nut to a terminal bar; a third wire connecting said receptacle to said main electrical panel, said third wire having a specific color that differs from said first wire and from said second wire that passes through said open bottom of said enclosure and that is connected to said main electrical panel via connection to a ground wire with copper split bolts; a fourth wire connecting said receptacle to said main electrical panel, said fourth wire having a specific color that differs from said first wire, from said second wire and from said third wire that passes through said open bottom of said enclosure and that is connected to said main electrical panel via connection to a ground wire with copper split bolts.

An alternate embodiment teaches a method for providing a portable, charging station for electric cars and appliances comprising: turning off power to a dwelling; acquiring a portable, charging station, said portable charging station further comprising: an enclosure having two sidewalls, a front panel, an open bottom and a top; a receptacle for receiving a charging device mounted to said top; a 50 amp circuit breaker inside of said enclosure; a first wire for direct connection from said receptacle to the main electrical panel of a dwelling, said first wire having a specific color that passes through said open bottom of said enclosure; a second wire for direct connection from said receptacle to said main electrical panel, said second wire having a specific color that differs from said first wire that passes through said open bottom of said enclosure; a third wire connecting said receptacle to said main electrical panel, said third wire having a specific color that differs from said first wire and from said second wire that passes through said open bottom of said enclosure; a fourth wire connecting said receptacle to said main electrical panel, said fourth wire having a specific color that differs from said first wire, from said second wire and from said third wire that passes through said open bottom of said enclosure; directly connecting said first wire to said main electrical panel with a terminal lug to a hot busbar screw that carries 120V AC and is secured thereto with a nut to a terminal bar; directly connecting said second wire to said main electrical panel with a terminal lug to a hot busbar screw that carries 120V AC and is secured thereto with a nut to a terminal bar; connecting said third wire to said main electrical panel via connection to a ground wire with copper split bolts; connecting said fourth wire to said main electrical panel via connection to a ground wire with copper split bolts; restoring power to said dwelling; and plugging in said electric car or other appliance.

DETAILED DESCRIPTION OF A PREFERRED EMBODIMENT

Figure 1A:
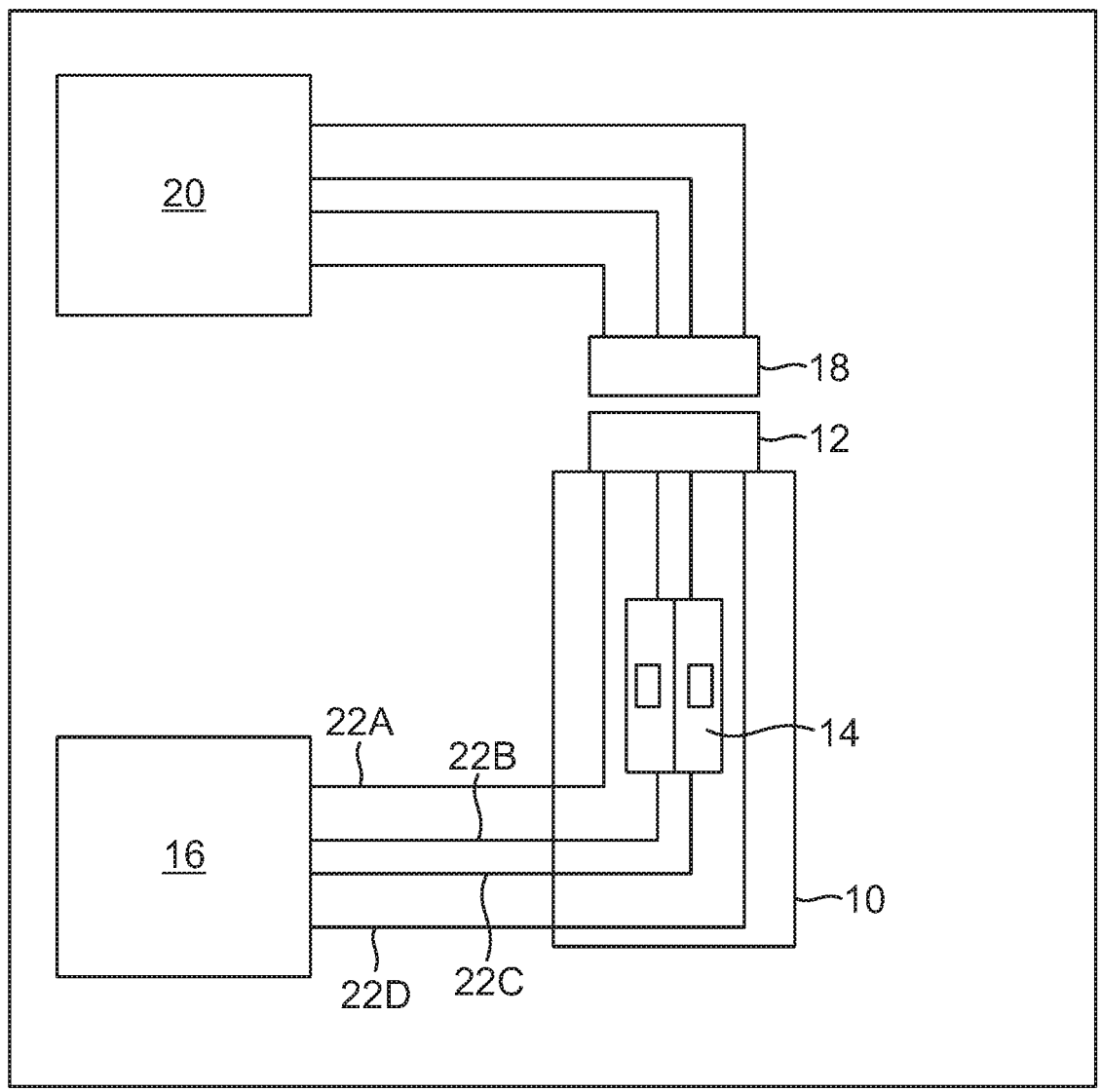
FIG. 1A is a schematic diagram showing the connection between the device of the main invention to the electric main panel of a dwelling as well as the connection to an electric vehicle.

Turning to the drawings, the preferred embodiment is illustrated and described by reference characters that denote similar elements throughout the several views of the instant invention.

The instant invention is a simple, portable device 10 that can be easily installed in a dwelling without the need for an electrician or building permits in order to provide Level 2 charging of an electric vehicle or any other appliance which uses 220 v charge. The device 10 is an enclosure that contains both a NEMA receptacle (14-50) 12 and a 50 amp circuit breaker 14 that is wired directly the main electrical panel 16 of the home or dwelling.

Figure 1B:
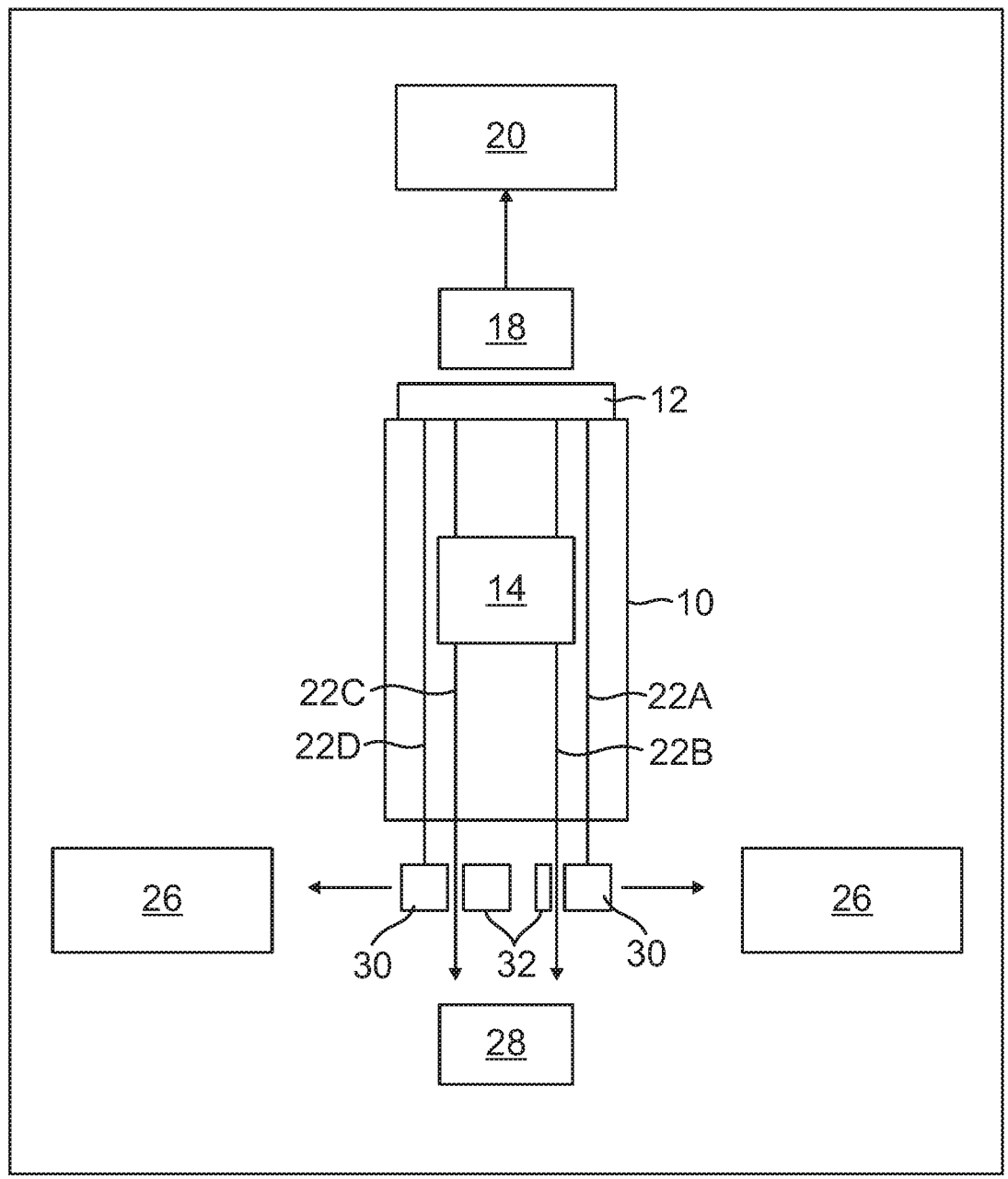
FIG. 1B is a schematic diagram showing the individual components inside of the device of the instant invention.
Figure 2:
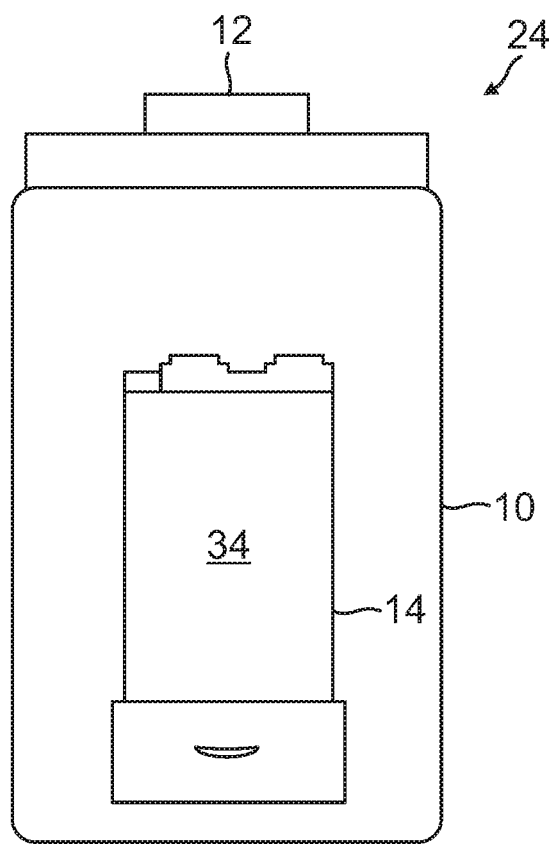
FIG. 2 is a front view of the device of the instant invention with the front door closed.
Figure 3:
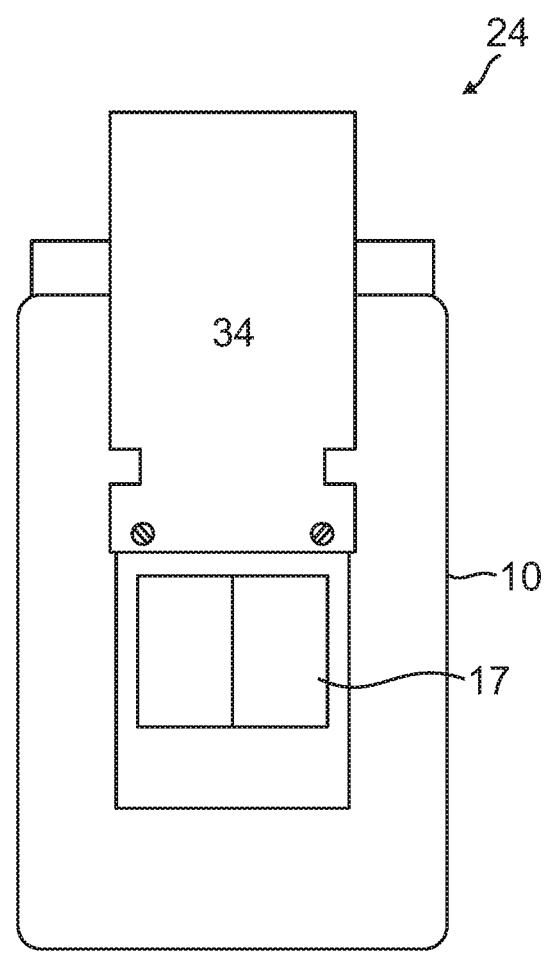
FIG. 3 is a front view of the device of the instant invention with the front door open.
Figure 4:
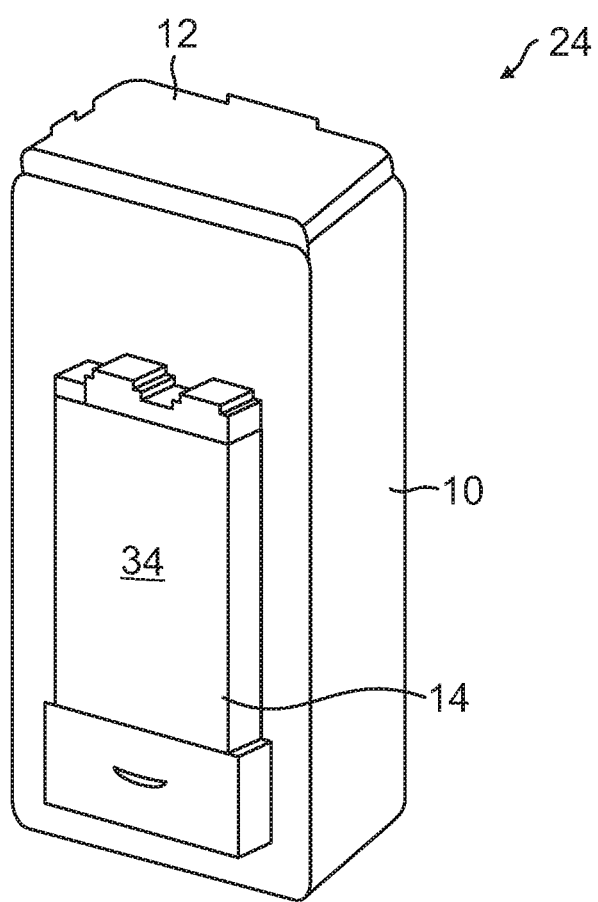
FIG. 4 is a side perspective view of the device of the instant invention showing the NEMA plug on the top of the device and the circuit breaker door on the front of the device.
Figure 5:
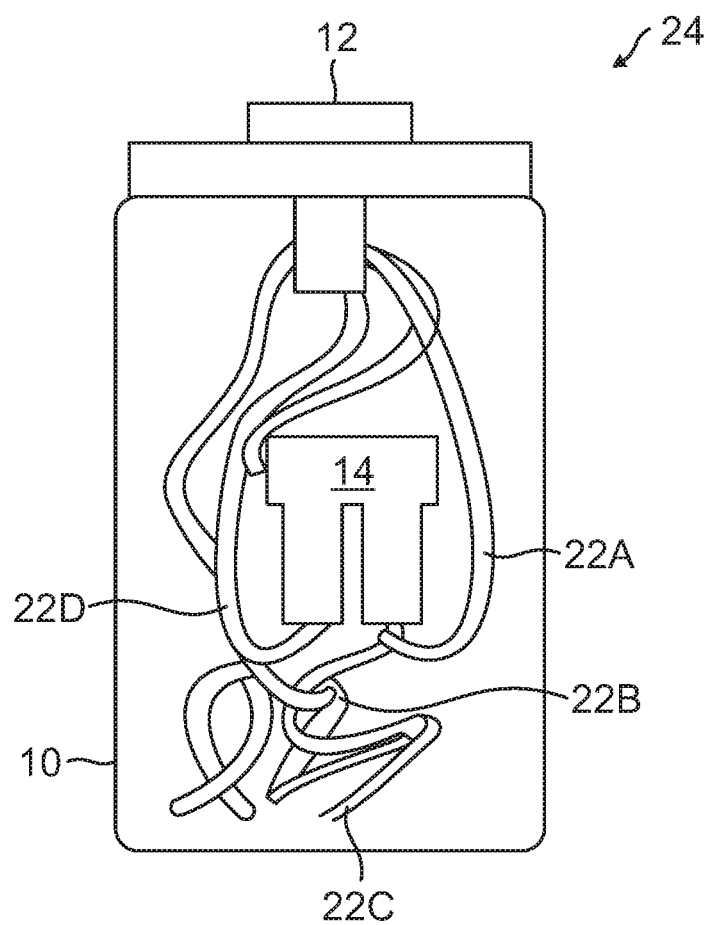
FIG. 5 is a front view of the device of the instant invention with the enclosure open exposing the components therein.
Figure 6:
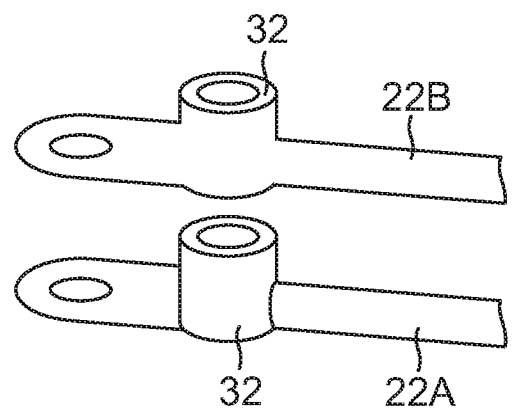
FIG. 6 is a top perspective view of the red and black wires that are to be connected to the 120 v terminals (hot busbars) at the electric service entrance, using offset terminal lugs.

FIGS. 1A-1B provide schematic representations of the system. FIG. 1A illustrates the enclosure device 10 with the NEMA 14-50 receptacle 12 atop the enclosure 10. This receptacle 12 mates with the NEMA 14-50 plug 18 found on electric vehicle 20 chargers or other appliances. A 50 am circuit breaker 14 is housed in the center of the enclosure 10 and covered by an openable and closeable door 34 (See FIGS. 2-4). A red wire 22A, a black wire 22B, a white wire 22C and a green wire 22D connect to the NEMA 14-50 receptacle 12 and pass through the enclosure 10 and connect to the main electrical panel 16.

The connection between the charging station enclosure box 10 to the home electrical service panel 16 is accomplished via four (4) 8 AWG wires 22A, 22B, 22C, 22D, each with the aforementioned colors. The red and black wires 22A, 22B carry the 240 v power and connect directly to the home electric service panel 16. The electrical connections from the charging station box enclosure 10 to the home service panel 16 go to the wall 24 and are not exposed to the outside elements where they can be damaged. If they do not go directly to the electric service panel 16, they should and must be then protected on an approved conduit.

Figure 9:
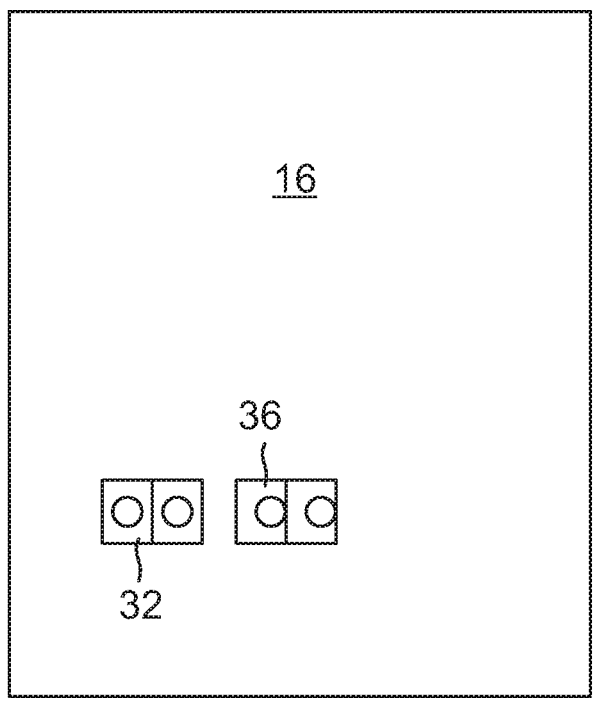
FIG. 9 is a close-up view of the electrical circuit breaker panel highlighting the connection point on the hot bulbar screw after 200 amp breaker.

The red and black wires 22A, 22B get secured to the home electrical service panel 16 by utilizing ¼" screws on the terminals. This is done by turning the main breaker down or otherwise having it toggled into the "off" position. No voltage will be present during installation. To install, the red wire 22A is attached with the terminal lug 32 to a hot busbar screw that carries the 120 v AC and it is secured with a ¼" nut to the terminal bar. This is repeated with the terminal lug 32 of the black wire 22B to the other 120 v bus bar (See FIG. 9).

Figure 7:
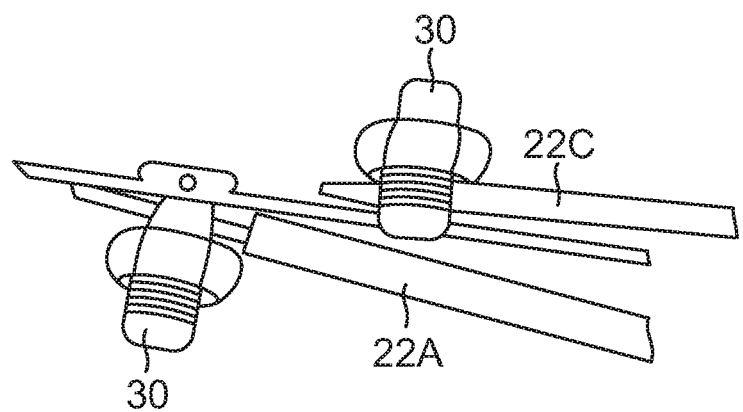
FIG. 7 is a side view of the green and white wires connected to the ground wire at the electric service entrance using split bolts.
Figure 8:
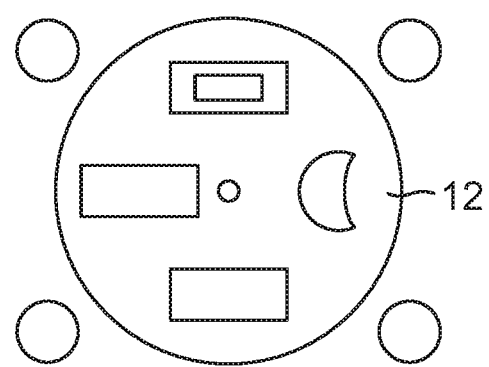
FIG. 8 is a top view of the device of the instant invention where the NEMA 14-50 receptacle is located and is where the electric vehicle plugs in for level two charging.

At the main electrical panel 16, the green wire 22D and the white wire 22C get connected to the ground wire 26 with copper split bolts 30 as shown in FIG. 7. The electrical charging station enclosure box 10 is then connected when the main house breaker is flipped back into the "on" position. With this process and device, no modifications are made to the home, the box 10 is easy to remove and the charging station/enclosure box 10 can be taken to any other desired location with 120 v power. It is almost as simple as unplugging a lamp from a light socket and transporting it. The NEMA 14-50 12 receptacle for receiving the car charging until is illustrated in FIG. 8.

The invention illustratively disclosed herein suitably may be practiced in the absence of any element which is not specifically disclosed herein.

The discussion included in this patent is intended to serve as a basic description. The reader should be aware that the specific discussion may not explicitly describe all embodiments possible and alternatives that are implicit. Also, this discussion may not fully explain the generic nature of the invention and may not explicitly show how each feature or element can actually be representative or equivalent elements. Again, these are implicitly included in this disclosure. Where the invention is described in device-oriented terminology, each element of the device implicitly performs a function. It should also be understood that a variety of changes may be made without departing from the essence of the invention. Such changes are also implicitly included in the description. These changes still fall within the scope of this invention.

Further, each of the various elements of the invention and claims may also be achieved in a variety of manners. This disclosure should be understood to encompass each such variation, be it a variation of any apparatus embodiment, a method embodiment, or even merely a variation of any element of these. Particularly, it should be understood that as the disclosure relates to elements of the invention, the words for each element may be expressed by equivalent apparatus terms even if only the function or result is the same. Such equivalent, broader, or even more generic terms should be considered to be encompassed in the description of each element or action. Such terms can be substituted where desired to make explicit the implicitly broad coverage to which this invention is entitled. It should be understood that all actions may be expressed as a means for taking that action or as an element which causes that action. Similarly, each physical element disclosed should be understood to encompass a disclosure of the action which that physical element facilitates. Such changes and alternative terms are to be understood to be explicitly included in the description.

What is claimed is:

1. A portable charging station for electric cars and appliances comprising:
   an enclosure having two sidewalls, a front panel, an open bottom and a top;
   a receptacle for receiving a charging device mounted to said top;

a 50 amp circuit breaker inside of said enclosure;

a first wire for direct connection from said receptacle to the main electrical panel of a dwelling, said first wire having a specific color that passes through said open bottom of said enclosure with a terminal lug to a hot busbar screw that carries 120V AC and is secured thereto with a nut to a terminal bar;

a second wire for direct connection from said receptacle to said main electrical panel, said second wire having a specific color that differs from said first wire that passes through said open bottom of said enclosure with a terminal lug to a hot busbar screw that carries 120V AC and is secured thereto with a nut to a terminal bar;

a third wire connecting said receptacle to said main electrical panel, said third wire having a specific color that differs from said first wire and from said second wire that passes through said open bottom of said enclosure and that is connected to said main electrical panel via connection to a ground wire with copper split bolts;

a fourth wire connecting said receptacle to said main electrical panel, said fourth wire having a specific color that differs from said first wire, from said second wire and from said third wire that passes through said open bottom of said enclosure and that is connected to said main electrical panel via connection to a ground wire with copper split bolts.

2. A method for providing a portable, charging station for electric cars and appliances comprising:

turning off power to a dwelling;

acquiring a portable, charging station, said portable charging station further comprising:

an enclosure having two sidewalls, a front panel, an open bottom and a top;

a receptacle for receiving a charging device mounted to said top;

a 50 amp circuit breaker inside of said enclosure;

a first wire for direct connection from said receptacle to the main electrical panel of a dwelling, said first wire having a specific color that passes through said open bottom of said enclosure;

a second wire for direct connection from said receptacle to said main electrical panel, said second wire having a specific color that differs from said first wire that passes through said open bottom of said enclosure;

a third wire connecting said receptacle to said main electrical panel, said third wire having a specific color that differs from said first wire and from said second wire that passes through said open bottom of said enclosure;

a fourth wire connecting said receptacle to said main electrical panel, said fourth wire having a specific color that differs from said first wire, from said second wire and from said third wire that passes through said open bottom of said enclosure;

directly connecting said first wire to said main electrical panel with a terminal lug to a hot busbar screw that carries 120V AC and is secured thereto with a nut to a terminal bar;

directly connecting said second wire to said main electrical panel with a terminal lug to a hot busbar screw that carries 120V AC and is secured thereto with a nut to a terminal bar;

connecting said third wire to said main electrical panel via connection to a ground wire with copper split bolts;

connecting said fourth wire to said main electrical panel via connection to a ground wire with copper split bolts;

restoring power to said dwelling; and plugging in said electric car or other appliance.

* * * * *